(12) United States Patent
Craddock et al.

(10) Patent No.: US 7,146,482 B2
(45) Date of Patent: Dec. 5, 2006

(54) MEMORY MAPPED INPUT/OUTPUT EMULATION

(75) Inventors: David F. Craddock, New Paltz, NY (US); Richard K. Errickson, Poughkeepsie, NY (US); Mark S. Farrell, Pleasant Valley, NY (US); Charles W. Gainey, Jr., Poughkeepsie, NY (US); Thomas A. Gregg, Highand, NY (US); Carol B. Hernandez, Poughkeepsie, NY (US); Donald W. Schmidt, Stone Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 10/723,506

(22) Filed: Nov. 25, 2003

(65) Prior Publication Data

US 2005/0114623 A1    May 26, 2005

(51) Int. Cl.
G06F 9/26 (2006.01)
(52) U.S. Cl. ..................................... 711/200; 711/203
(58) Field of Classification Search .................. None
See application file for complete search history.

(56) References Cited

U.S. PATENT DOCUMENTS

| | | | |
|---|---|---|---|
| 5,721,858 A | 2/1998 | White et al. | 395/413 |
| 6,061,757 A | 5/2000 | Arimilli et al. | 710/264 |
| 6,212,592 B1 | 4/2001 | Klein | 710/260 |
| 6,442,634 B1 | 8/2002 | Bronson et al. | 710/260 |
| 6,442,635 B1 | 8/2002 | Brightman et al. | 710/268 |
| 6,598,144 B1* | 7/2003 | Bailey et al. | 711/203 |
| 6,742,075 B1* | 5/2004 | Bailey et al. | 710/310 |
| 7,003,586 B1* | 2/2006 | Bailey et al. | 709/250 |
| 2002/0165897 A1* | 11/2002 | Kagan et al. | 709/102 |
| 2003/0046505 A1* | 3/2003 | Craddock et al. | 711/165 |
| 2003/0188062 A1* | 10/2003 | Luse et al. | 710/104 |
| 2004/0024833 A1* | 2/2004 | Siddabathuni | 709/212 |

(Continued)

FOREIGN PATENT DOCUMENTS

JP    9069072 A    3/1997

OTHER PUBLICATIONS

Formal Properties of Recursive Virtual Machine Architectures. Gerald Belpaire* New York University and Nai-Ting Hsu* University of Wisconsin .* Department of Computer Science, Courant Institute of Mathematical Sciences. This work is supported by ERDA under contract E(11-1)-3077. ** Computer Sciences Department and Mathematics Research Center. This work is supported in part by the US Army contract DAHCO4-75-C-0024, pp. 89-96.

(Continued)

Primary Examiner—Mano Padmanabhan
Assistant Examiner—Kaushik Patel
(74) Attorney, Agent, or Firm—Cantor Colburn LLP

(57) ABSTRACT

A method of managing memory mapped input output operations to an alternate address space comprising: executing a first instruction directed to a first memory mapped input output alternate address space of a machine associated with a first adapter to allocate a resource associated with the first adapter to a process in accordance with a definition of a z/Architecture; wherein a selected process issues at least one of a load and a store instruction executed in a problem state of the machine to a selected address location of a selected resource. The method further includes ensuring that the selected resource corresponds with the allocated resource and determining that the selected process corresponds with the process to which the resource is allocated.

12 Claims, 3 Drawing Sheets

U.S. PATENT DOCUMENTS

2004/0030854 A1* 2/2004 Qureshi et al. ............. 711/170

OTHER PUBLICATIONS

DAISY: Dynamic Compilation for 100% Architectural Compatibility. Kemal Ebcioglu and Erik R. Altman. IBM Thomas J. Watson Research Center, Yorktown Heights, NY 10598. {kemal,erik}@watson.ibm.com. 1997 ACM 0-89791-901-7/97/0006 . . . $3.50 pp. 26-37.

Emulation—A Useful Tool in the Development of Computer Systems. F.A. Salomon and D.A. Tafuri. Bell Laboratories, Naperville, IL Annual Simulation symposium. pp. 55-71.

IBM Technical Disclosure Bulletin, vol. 38, No. 07 Jul. 1995. Emulating Memory Mapped File Input/Output on OS/2. pp. 505-507.

Design Challenges of Virtual Networks: Fast, General-Purpose Communication. Alan M. Mainwaring, Computer Science Division, University of California at Berkely. Berkeley, CA 94720-1776 and David E. Culler, Computer Science Division, University of California at Berkeley, Berkeley, CA 94720-1776. May 1999 Atlanta, GA, USA. 1999 ACM 1-58113-100-3/99/0004 . . . $5.00.

U.S. Appl. No. 10/723,044, filed Nov. 25, 2003, Errickson et al.

U.S. Appl. No. 10/723,405, filed Nov. 25, 2003, Brice et al.

* cited by examiner

| AT | AID=0000 | AID=0001 | AID=0002 | ... | AID=FFFF |
|---|---|---|---|---|---|
| 00 | ART_EXAMPLE | | | | |
| 01 | | | | | |
| 02 | | | | | |
| : | : | : | : | ...................... | : |
| FE | | | | | |
| FF | | | | | |

ADAPTER-TYPE / ADAPTER-ID TO ADAPTER-RESOURCE TABLE ADDRESS

FIG. 2A

| RT | ART_EXAMPLE |
|---|---|
| 00 | ART ENTRY0 |
| 01 | ART ENTRY1 |
| 02 | ART_EXAMPLE ENTRY FOR CQ RESOURCE TYPE |
| 03 | |
| | : |
| FF | ART ENTRY255 |

ADAPTER RESOURCE TABLE (ART)

FIG. 2B

| DWORD | ART_EXAMPLE ENTRY FOR CQ RESOURCE TYPE | | | | |
|---|---|---|---|---|---|
| 0 | ASAB | PRC | | MRC | |
| 1 | SAC | RESERVED | SMC | RESERVED | |
| 2 | RESERVED | LARID | | RESERVED | RIL |
| 3 | ACCESS-TABLE ADDRESS (ATA) - AT IS FOR ALL CQ RESOURCES | | | | RESERVED |
| 4 | ADAPTER-STORAGE BASE ADDRESS FOR SAT=0 | | | | RESERVED |
| 5 | ADAPTER-STORAGE BASE ADDRESS FOR SAT=1 | | | | RESERVED |
| 6-18 | : | | | | RESERVED |
| 19 | ADAPTER-STORAGE BASE ADDRESS FOR SAT=15 | | | | RESERVED |
| BITS | 0       8       16 | 32 | 40 | 52 | 63 |

ADAPTER-RESOURCE-TABLE ENTRY (ARTE)

FIG. 2C

MEMORY MAPPED INPUT/OUTPUT EMULATION

FIELD OF THE INVENTION

This invention is related to Memory Mapped Input/Output (MMIO) and the interfaces in the z/Architecture.

BACKGROUND OF THE INVENTION

Memory-Mapped I/O is a well-known mechanism used by many processors, such as Intel® processors and Power PC® processors, among others, to access Input Output (I/O) devices. Through this mechanism, I/O device controls are mapped into a range of well-known addresses. Dynamic address translation mechanisms along with translation lookaside buffers (TLB) are implemented in hardware to provide the mapping. I/O devices are accessed through regular load and store instructions by specifying addresses that correspond to I/O device controls.

zSeries® machines are based on the z/Architecture®. The z/Architecture® and its predecessors have traditionally used I/O channels to access I/O device controls and are not configured to directly support the memory-mapped I/O paradigm. pSeries® and iSeries® machines are based on the PowerPC® processor which uses the memory-mapped I/O paradigm.

The InfiniBand™ architecture defines an Input Output (I/O) networking standard that provides zero processor-copy data transfers, i.e., with no kernel involvement, between its I/O and Inter-Process Communication (IPC) clients, and uses hardware to provide highly reliable, fault tolerant communications. Interfaces that conform to the InfiniBand™ architecture standard may exhibit preferred capabilities and wide industry acceptance.

Therefore, what is needed in the art in order to provide greater interoperability with industry standard I/O devices, for the z/Series® architecture, is support for InfiniBand™ in the z/Architecture®.

BRIEF SUMMARY OF AN EXEMPLARY EMBODIMENT

The shortcomings of the prior art are overcome and additional advantages are provided through the provision in an exemplary embodiment of a method of managing memory mapped input output operations to an alternate address space comprising: executing a first instruction directed to a first memory mapped input output alternate address space of a machine associated with a first adapter to allocate a resource associated with the first adapter to a process in accordance with a definition of a z/Architecture; wherein a selected process issues at least one of a load and a store instruction executed in a problem state of the machine to a selected address location of a selected resource. The method further includes ensuring that the selected resource corresponds with the allocated resource and determining that the selected process corresponds with the process to which the resource is allocated.

Also disclosed herein in another exemplary embodiment is a system for managing memory mapped input output operations to an alternate address space comprising: a means for executing a first instruction directed to a first memory mapped input output alternate address space of a machine associated with a first adapter to allocate a resource associated with the first adapter to a process in accordance with a definition of a z/Architecture; wherein a selected process issues at least one of a load and a store instruction executed in a problem state of the machine to a selected address location of a selected resource. The system also includes a means for ensuring that the selected resource corresponds with the allocated resource and a means for determining that the selected process corresponds with the process to which the source is allocated.

Further disclosed herein in yet another exemplary embodiment is a storage medium encoded with a machine-readable computer program code, the code including instructions for causing a computer to implement the above-mentioned method of managing memory mapped input output operations to an alternate address space.

BRIEF DESCRIPTION OF THE DRAWINGS

These and other objects and advantages of the present invention may be best understood by reading the accompanying detailed description of the exemplary embodiments while referring to the accompanying figures wherein like elements are numbered alike in the several figures in which:

FIG. 2A is a diagram depicting an illustrative Adapter Resource Table in accordance with an exemplary embodiment;

FIG. 2B is a diagram depicting an illustrative Adapter Resource Table Entry in accordance with an exemplary embodiment;

FIG. 2C is a diagram depicting an illustrative Adapter Resource Table Entry including Access Table Address in accordance with an exemplary embodiment.

The detailed description explains the preferred embodiments of our invention, together with advantages and features, by way of example with reference to the drawings.

DETAILED DESCRIPTION OF THE EXEMPLARY EMBODIMENTS

Disclosed herein in the exemplary embodiments are the mechanisms devised to provide and implement a memory-mapped input/output (I/O) paradigm in the z/Architecture®. In a first exemplary embodiment, denoted Emulation of Memory-Mapped I/O in the z/Architecture®, the base infrastructure is developed to provide memory-mapped I/O in the z/Architecture® and the authorization mechanisms used to provide isolation between operating system (OS) images and validate resource ownership are described. In another exemplary embodiment, denoted Memory-Mapped I/O Operations (MMIO) in the z/Architecture®, load and store operations to the MMIO adapter address space, including access-rights validation, adapter-address space access rules of precedence, and resource address translation are described. In yet another exemplary embodiment, denoted Memory-Mapped I/O Virtualization in the z/Architecture®, the mechanisms to allow large scale sharing of memory-mapped-I/O adapter resources and provide resource isolation among O/S images in a virtualized environment, e.g., zVM® are defined and described. This is achieved through adapter virtualization and software emulation of adapter resources. The approach employed provides the environment necessary to emulate memory-mapped I/O in the z/Architecture®. Not only does this mechanism provide the basis for memory-mapped I/O (MMIO) operations, but also the authorization validations necessary to preserve system integrity in a logical-partitioned environment. That is, MMIO operations in one logical partition will be isolated from any other MMIO activity in all the other partitions.

To support the design effort for a common eServer® Host Channel Adapter (HCA), zSeries® architecture needs to access an eServer® Host-Channel Adapter using a memory-mapped I/O paradigm. A mechanism to emulate memory-mapped I/O operations in the z/Architecture® has been developed to support the eServer® InfiniBand™ Host-Channel Adapter. The mechanism provides memory-mapped I/O in the z/Architecture®, and is not restricted to the host-channel adapter but any alternate address space, which for this disclosure will be referred to as an adapter. The approach employed is considered sufficiently general to be used with any memory-mapped I/O adapter. It will be appreciated by one skilled in the art that a host-channel adapter is employed for illustrative purposes only, any other memory-mapped I/O adapter may be employed.

Emulation of MMIO

Figure 1:
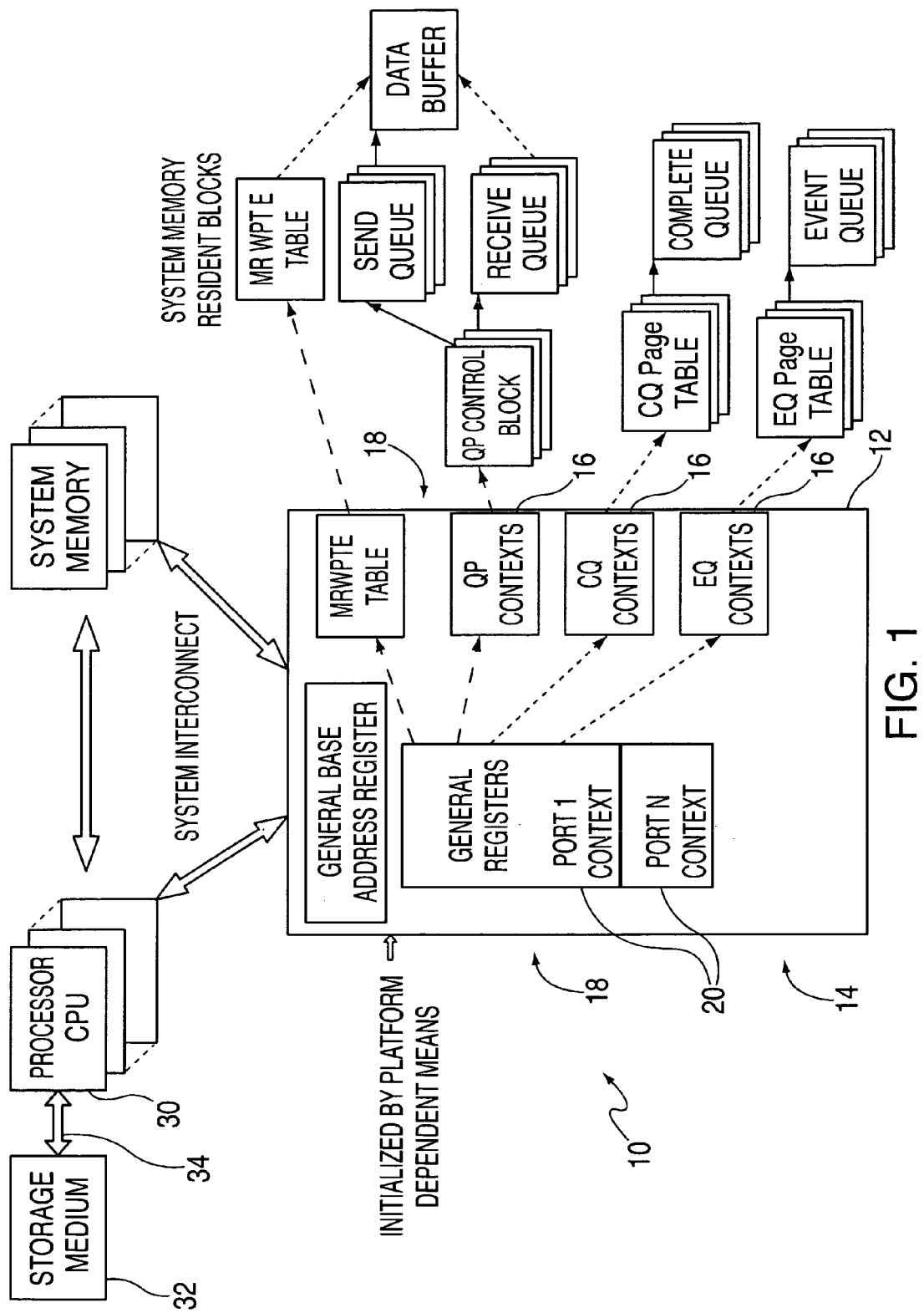
FIG. 1 is a simplified block diagram depicting a computer system for implementation of a methodology in accordance with an exemplary embodiment.

Referring now to FIG. 1, a simplified block diagram depicting computer system 10 for implementation of the various embodiments disclosed herein and the interaction between the various elements is provided. In an exemplary embodiment, Memory-Mapped I/O (MMIO) operations are performed on a memory-mapped I/O (MMIO) adapter 12. A memory-mapped I/O adapter 12 is designated by an adapter type (AT), which denotes a class of MMIO adapter 12 such as, but not limited to, the InfiniBand™ Host-Channel Adapter (HCA) or any other future MMIO adapter 12, and an adapter identifier (AID) which is used to distinguish between two MMIO adapters of the same type.

An MMIO adapter 12 contains a storage area 14, also referred to as the adapter address space and a set of adapter resources 16 that constitute a communication interface with the adapter. In an exemplary embodiment, a memory-mapped-I/O-adapter address space (MMIO address space) 14 is a storage area located in the MMIO adapter 12, which is to be accessed. In the exemplary embodiments, the MMIO adapter 12 is accessible through two new instructions. The new instructions, denoted LOAD MEMORY-MAPPED I/O (LIO) and STORE MEMORY-MAPPED I/O (STIO) are addressed in detail at a later point herein, especially in the section regarding, Memory-Mapped I/O Operations in the z/Architecture®.

In an exemplary embodiment, a MMIO address space 14 is divided into storage areas 18 that provide different levels of access protection and contain control information associated with the adapter resources 16 defined for the MMIO adapter 12. Each storage area, comprised of some number of blocks, is said to have a storage-area type. It will readily be appreciated that while in an exemplary embodiment 4 KB blocks are employed based on commonly used storage granularity in the industry standard, numerous variations in block sizes are conceivable and possible. The controls in the MMIO address space 14 are organized in registers 20, which are located at selected offsets within the storage areas 18. These registers 20 contain various adapter controls and may in turn contain the absolute addresses of main storage locations. Access-ordering and storage-consistency rules for an MMIO address space 14 are specific to an MMIO adapter-type 12 and are independent of the storage consistency rules defined for main storage in the z/Architecture®.

In an exemplary embodiment, one or more storage-area types can be assigned to an adapter resource type (RT) to allow different levels of access rights. Machine design determines the correspondence between problem state and supervisor state (see z/Architecture) vis-à-vis the privilege levels associated with each storage-area type. For example, the eServer® InfiniBand™ host-channel adapter (HCA) supports the following storage-area types in decreasing order of access protection:
Super Privileged Storage Area (SPSA)
Real Storage Area (RSA)
Privileged Storage Area (PSA)
User Storage Area (USA)

Furthermore, in an exemplary embodiment, an adapter resource 16 is designated by a resource type (RT) and a resource identifier (RID). A resource 16 of an adapter 12 is a functional component of an adapter 12 that can be identified and assigned to an owning program/process. For example, the eServer® InfiniBand™ host-channel adapter supports the following resource types:
Queue Pair (QP)
Completion Queue (CQ)
Event Queue (EQ)
Memory Region/Window Page-Table Entry (MRWPTE)

Adapter resources 16 are owned by/allocated to processes. In an exemplary embodiment, a process utilizes a resource-address designation (RAD) to access data associated with a selected adapter resource 16 in the MMIO adapter address space 14. The resource-address designation does not map to a main-storage address. Instead, access to data associated with an adapter resource 16 is given by equating the resource-address designation to a storage-area location 22 within the MMIO address space 14.

An adapter driver of the kernel/OS assigns process-level access rights of adapter-storage areas 18 to a process. Such assignment is via the problem-state controls that are established during resource 16 allocation. It will further be appreciated that the access rights available for an adapter-storage area 18 are determined by the configuration of the adapter 12 and are manifested in the storage area types provided by that adapter 12. Once a particular process is given access to the appropriate storage area(s) in the MMIO adapter address space 14, the adapter driver facilitates the decoding between the process and the adapter-storage area. The memory mapped I/O adapter 12 is designed to allow authorized processes to access any storage location 22 of the adapter-storage areas 18 assigned to a resource 16, without affecting the adapter-storage areas 18 assigned to other resources 16. It will be appreciated that such access is facilitated by the problem-state controls (PSC) established for an arbitrary resource at allocation time.

In an exemplary embodiment, an adapter 12 may include its own memory caching with respect to resource contexts that are program accessible as adapter storage and are located in machine memory. It is noteworthy to appreciate that internal adapter storage of the resources 16 is essentially a cache where the backing storage is in machine memory. This is done because all of the context contents of all of the resources 16 may not necessarily simultaneously fit in an adapter. In other words, an adapter 12 may not actually be as large as the cumulative sum of all allocated resources. For example, each allocable resource has some portion of its associated context in the adapter proper and some portion can be available in an associated cache of the adapter. However, the cache can be shared by many resources of the adapter. The backing storage of the cache is located in machine storage, which is still not directly accessible by a program. With the adapter 12, the adapter storage areas can be accessed because it is an alternate address space. Having a caching I/O adapter 12 enables the opportunity for the adapter 12 to economize regarding its inboard storage capacity.

Overview of Use of Resource-Management Instructions

When an adapter resource 16 is needed, in an exemplary embodiment, the ALLOCATE ADAPTER RESOURCE (ALAR) instruction is executed specifying the appropriate resource type, adapter type and adapter identifier. The ALLOCATE ADAPTER RESOURCE INSTRUCTION finds an available resource 16 and returns a resource identifier to be used by the program for future MMIO load/store operations, among others. Access rights and controls associated with the resource are set at allocation time. Modifiable access rights and controls associated with the resource can be altered later by executing the MODIFY ADAPTER RESOURCE (MAR) instruction. Once a resource 16 is allocated, LOAD MEMORY MAPPED I/O and STORE MEMORY MAPPED I/O can be used to access data associated with the resource 16, by specifying a storage-area type (SAT) and the location of the data within the adapter-storage area 18. When the resource 16 is no longer needed, FREE ADAPTER RESOURCE (FAR) is used to clear resource controls in the MMIO adapter 12 and access-rights and ownership information kept in machine storage.

The ALLOCATE ADAPTER RESOURCE (ALAR) instruction, and it's companion FREE ADAPTER RESOURCE (FAR), are defined to be supervisor-state instructions in the z/Architecture®. Therefore, the operating system establishes the set of resources that may be used by a problem-state application. However, the LOAD MEMORY MAPPED I/O (LIO) and STORE MEMORY MAPPED I/O (STIO) instructions are capable of being executed in the problem state, as determined by controls associated with each individual resource 16 when it is allocated. This permits the application, under previously defined rules, to directly access an adapter resource 16. Advantageously, due to the established rules from the allocation process, the application is able to directly interface with the adapter 16, thereby removing significant layers of delay often associated with accessing storage via the operating system. Instead of authorizing each individual access of an adapter 12, an authorized "pipeline" is established for an application that only it can use. However, because of the direct authorization, each such application is protected from interference with all other applications, yet without the usual overhead of real-time operating-system engagement.

The establishment of the controls used to confine an application is accomplished by the supervisor during the allocation process. These include the problem-state controls (PSC), process identifier (PID), and PID-type (PT). For each individual resource 16 allocated, the PSC determines the storage-area 18 types that the problem-state application may directly access without any intervention or assist from the operating system. The PID is used to distinguish a given problem-state application from all others in the operating system. Each resource 16 allocated is "tagged" with the PID to which the resource 16 is allocated. During application execution, the PID is used by the machine to verify that a particular application owns the specified resource 16 it is attempting to access (via LIO or STIO). The PT is a means of supporting differing operating systems in that each operating system may have a different real address used to contain the PID of the currently executing application. Therefore, because the machine has both the PT and the PID, it is possible to support as many as 255 operating systems. A PT value of zero disables PID checking.

In another exemplary embodiment the previously specified MODIFY ADAPTER RESOURCE (MAR) instruction and STORE ADAPTER RESOURCE (STAR) instruction are eliminated. In this instance, the allocation of resources 16 is relied upon to ensure accuracy and validity of an allocation, thereby removing the need to subsequently modify or update any information associated with a resource 16.

Allocation and Management of MMIO-Adapter Resources

In an exemplary embodiment, access to the adapter-storage areas 18 is controlled in two ways. The storage-area types (SAT) isolate the most-restricted information, such as, but not limited to, logical-partition (LPAR) ownership, up to the least-restricted user-accessible information such as, but not limited to, user information such as a queue pair door bell and the like. In addition, resource controls and resource-ownership information, including access rights to adapter-storage areas 18, are associated with a resource 16, to validate access to the different storage areas 18 assigned to a resource 16.

In an exemplary embodiment to implement MMIO, four privileged instructions, denoted ALLOCATE ADAPTER RESOURCE (ALAR), FREE ADAPTER RESOURCE (FAR), MODIFY ADAPTER RESOURCE (MAR), and STORE ADAPTER RESOURCE (STAR), have been defined to facilitate management of the various adapters 12 and resources 16.

Allocation of a resource 16 is a process that establishes several parameters associated with a resource 16. Some, but not necessarily all parameters are under control of the program initiating a resource allocation request (i.e., issues the ALLOCATE ADAPTER RESOURCE (ALAR) instruction). Resource controls, resource-ownership information, and access rights to adapter-storage areas 18 associated with a resource 16 are communicated to the program in the resource-information block (RIB). The resource-information block (RIB) contains information that characterizes an adapter resource 16. This information is specified or otherwise established during the execution of the ALLOCATE ADAPTER RESOURCE instruction and is used to validate access to designated adapter-storage-area types occupied by the resource 16 when memory-mapped I/O load and store operations are performed.

The resource-information block (RIB) is the operand of the MODIFY ADAPTER RESOURCE instruction, which may be utilized to alter certain controls associated with a given adapter resource 16. Resource controls, resource-ownership information, and access rights to adapter-storage areas 18 associated with a resource 16 may also be readily reset using a FREE ADAPTER RESOURCE instruction.

The following information is associated with an adapter resource 16 and stored in a resource-information block (RIB). Table 1 depicts an illustrative resource information block (RIB):

TABLE 1

Resource-Information Block (RIB).

| Bytes 0–7 | PSC | | RESERVED | | PT |
|---|---|---|---|---|---|
| Bytes 8–15 | PN | RESERVED | | PID | |
| | 16 | 32 | 48 | 56 | 63 |

In an exemplary embodiment, the RIB is a 16-byte word, which includes resource controls and resource-ownership information, including access rights to adapter-storage areas. Referring to the table:

Problem-State Controls (PSC): This field specifies whether the corresponding adapter-storage-area type can be accessed in the problem state. In an exemplary embodiment, a one byte field is employed with a 4 bit code utilized, where a code of 1 indicates Real, Privileged, Error, and User storage areas may be accessed in a problem state; a code of 2 indicates only Privileged, Error, and User storage areas may be accessed in a problem state; a code of 3 indicates only Error, and User storage areas may be accessed in a problem state; a code of 4 indicates only User storage areas may be accessed in a problem state; a code of 5 indicates no storage areas may be accessed in a problem state; and all other codes are reserved. PSC is configured in a hierarchical expression/definition since protection schemes are arranged as a series of containment relationships where the innermost container is the most restricted and the outermost is the least restricted.

PID Type (PT): The PID type specifies the type of process identifier associated with the resource 16. The PID-type value is used to obtain the process identifier when a memory-mapped I/O load or store operation is performed in the problem state.

Partition Number (PN): The partition number identifies a logical partition when the machine is operating in a logical partition (LPAR) mode. The partition number is employed to ensure coordination between a process and its allocated resource. Because a process operates within a logical partition, the machine's designation used to determine a particular logical partition also serves as a component involved in the identification of an allocated resource 16. In other words, during the allocation process, the resource 16 is "tagged" with the PN so that subsequent access attempts can verify that the resource 16 is indeed owned by the accessing logical partition. This level of granularity of ownership is the lowest level (given that the particular adapter has been also determined to be owned or shared by the logical partition). This value is established during initial micro-code load (IML) (e.g., an initialization) and is bound to a customer-named logical partition. (See also Relocation Zone RZONE).

Process Identifier (PID): The process identifier identifies an OS process and is used along with the partition number to verify access rights to any of the adapter-storage areas 18 allocated to an adapter resource 16. The PID may be considered to be a further refinement or subdivision of ownership, above that of the partition number. In other words, the PN is a first-level of subdividing all resources 16 of a given adapter 12. Therefore, a PID can be considered to be a second level or further subdivision. It would further be appreciated, that when a guest-2 scenario is the case, the guest-owner ID (GOID) is a similar subdividing factor that lies between PN and PID. This provides a three-tier breakout to apply and enforce resource 16 ownership.

Allocate Adapter Resource

The ALLOCATE ADAPTER RESOURCE (ALAR) instruction of an exemplary embodiment allocates one or more resources 16 of a specified type in a designated MMIO adapter 12 and sets controls and access rights associated with the allocated resources 16. The ALAR instruction registers a resource 16 to an owner, that is, a particular process within an operating system (OS) image, and gives its owner access to the resource storage areas 18. It will be appreciated that while a given resource 16 may be allocated to a particular process (owner), however, access to some storage-area types 18 of a resource 16 may or may not be permitted as a function of privilege of the process/owner. A resource 16 needs to be allocated before a load or store operation to the adapter's address space 18 can be utilized. However, it will be appreciated that adapter scoped facilities may exist that do not require allocation in order to permit access to the adapter storage space. In selected instances, for example, with specially authorized logical partitions or programs, load/store to an adapter address space may precede allocation. For example, there are adapter-common storage areas involved with initialization and management of the adapter itself. The access rights and ownership information set up for an adapter resource 16, when it is allocated, are later used during load and store operations to the adapter address space 18, to validate access to the different storage areas assigned to the resource 16.

In an exemplary embodiment, the following inputs are specified to allocate an adapter resource 16: an adapter type (AT) and an adapter identifier (AID) that, taken together, designate a particular memory-mapped I/O adapter; the type of resource 16 (RT) that needs to be allocated; the number of resources 16 to be allocated; the process-identifier type (PT) and process identifier (PID) that will be associated with the allocated resources 16, and the problem-state controls associated with each of the storage-area 18 types assigned to the allocated resources 16. It will be appreciated that while in an exemplary embodiment, the preceding parameters have been enumerated for operation of the ALAR instruction, the listing is illustrative and not intended to be exhaustive; other parameters may readily be envisioned and employed. The ALAR instruction returns the resource identifiers (RID) of the allocated resource(s) 16 and a count of allocated resources 16; that is, the number of resource identifiers returned (for the allocated resource type RT).

In addition, it will be appreciated that in another exemplary embodiment, the logistics of handling, balancing and optimizing situations where a resource 16 is allocated (or at least the allocation is requested with an ALAR instruction) and the result returned does not match that which was requested are considered. For instance, in one embodiment, addressing the limitations when a reduced number of resources is returned, or dividing all available resources between logical partitions and allocations to particular processes. One approach to addressing such partitioning is to equally divide resources among logical partitions. Whatever the particular algorithm established for apportionment of resources 16, an underlying policy may be provided by the machine such that the distribution of resources 16 and adapters 12 is managed according to customer-determined requirements.

The process-identifier type (PT), process identifier (PID), and problem-state controls associated with the allocated resources 16 are set to the specified values. The partition number associated with the allocated resource 16 is set to the partition number of the issuing logical partition. The guest-owner ID (GOID) of the issuing program/process, when applicable (e.g., the issuer is a second-level guest, also known as a guest-2), is used to further distinguish ownership of the resource 16. In addition to registering access rights and ownership information associated with the resource in machine storage, resource controls located in registers within the adapter 12 are initialized as well. Resource controls and initialization values are determined by the adapter 12 type and resource type.

Free Adapter Resource

The FREE ADAPTER RESOURCE (FAR) instruction of an exemplary embodiment frees a previously allocated resource(s) 16 and makes it/them available for allocation to any other process and OS image that has accessibility to the adapter. The controls and access rights associated with the freed resource(s) 16 are re-set to initial values, zeros in most but not necessarily all cases. This includes all the information stored in a resource-information block (RIB) when a STORE ADAPTER RESOURCE (STAR) instruction is executed. The number of resources 16 actually freed is returned. Once a resource 16 is freed, load and store operations to access adapter storage areas assigned to the resource 16 cannot be successfully completed.

In an exemplary embodiment, the following inputs are specified to free an adapter resource 16: an adapter type (AT) and adapter identifier (AID) that designate a particular memory-mapped I/O adapter, the type of resource (RT) that needs to be freed, and the number of resources 16 to be freed. The selection of resources to be freed is dictated by a resource selector (RS).

In an exemplary embodiment, when adapter-ID selection is specified via the resource selector (RS), all or some of the resources 16 of the specified type that are in the configuration and are allocated in the designated adapter 12, are freed. When RID selection is specified by the resource selector (RS), a number of resources 12 of the specified type that are in the configuration and are allocated in the designated adapter 12, are freed. The number of resources 16 to be freed and the identifiers of the resources 16 to be freed are provided as inputs. When PID selection is specified by the resource selector (RS), the resources 16 allocated in the designated adapter 12 that are associated with the process identifier PID are freed. The FAR instruction returns a count of freed resources 16; that is, the number of resources 16 returned (for the specified resource type RT).

In addition to resetting access rights and ownership information associated with the resource 16 in machine storage, resource controls located in registers within the adapter address space 14 are reset as well as part of the free operation. Resource controls and reset values are determined by the adapter type (AT).

It will be appreciated that operations to free an allocated resource 16 should be serialized with respect to STORE MEMORY-MAPPED I/O (STIO) instructions accessing that resource 16 to avoid access when a resource 16 is in some undefined, intermediate state. In addition, a resource 16 currently engaged in a LOAD MEMORY-MAPPED I/O or a STORE MEMORY-MAPPED I/O operation should not be freed until the I/O operation completes. That is, resource validations and the associated memory-mapped I/O resource access performed as part of memory-mapped I/O load and store operations need to be atomic relative to operations to free an allocated resource 16. In other words, the MMIO load and store operations need to be completed before other functions may be initiated.

Modify Adapter Resource

The MODIFY ADAPTER RESOURCE (MAR) instruction of an exemplary embodiment facilitates changes to the access rights and controls associated with a specified resource 16. The resource 16 is designated by an adapter type (AT); adapter identifier (AID); resource type (RT); and resource identifier (RID). The information associated with the resource 16 is provided in a resource-information block (RIB). Only the contents of the problem-state controls, RID type, and RID are changed. The designated adapter 12 is not accessed.

Store Adapter Resource

The STORE ADAPTER RESOURCE (STAR) instruction of an exemplary embodiment, stores access rights and controls associated with the specified adapter resource 16 in the specified resource information block (RIB). The resource 16 is designated by an adapter type (AT); adapter identifier (AID); resource type (RT); and resource identifier (RID). Once again, the designated adapter 12 is not accessed.

The main reason for including a capability to store and then modify an adapter resource 16 is (1) to alter the start interpretive execution controls (e.g., SIEC, RZONE), (2) to permit a hypervisor or OS to re-assign the resource 16 without having to entirely free it and then reallocate (PT, PID), or (3) to allow for a change in the problem-state controls (PSC).

I/O Operations in z/Architecture

In an exemplary embodiment a MMIO address space 14 is accessible only through the LOAD MEMORY-MAPPED I/O (LIO) and STORE MEMORY-MAPPED I/O (STIO) instructions. The LOAD MEMORY-MAPPED I/O operation loads data from the specified adapter-storage location 22. The STORE MEMORY MAPPED I/O operation stores data in the specified adapter-storage location 22. The type of MMIO adapter 12 being accessed is specified by the instruction.

As described earlier, the LOAD MEMORY-MAPPED I/O (LIO) and STORE MEMORY-MAPPED I/O (STIO) instructions are defined to allow supervisor code and problem state code controlled access to the various storage-area 18 types associated with a resource 16. Access to specific controls in the MMIO adapter 12 is provided after validating resource allocation (e.g., "ownership" and access rights) to the specified adapter-storage area 18.

In an exemplary embodiment, checking to validate resource ownership is performed, which is established through the logical partition number PN/RZONE, guest/owner identification GOID, process type PT, and process identifier PID associated with the specified resource 16. Problem-state control checking is performed to validate access rights to the specified storage area 18 specified via the problem-state controls associated with a resource 16 for each storage-area 18 type.

In an exemplary embodiment, a storage location 22 in the MMIO adapter address space 14 is specified by a resource-address designation (RAD). For example, in one implementation, a RAD is configured as 8 bytes long and is comprised of the resource type (RT), adapter identifier (AID), resource identifier (RID), storage-area type (SAT), and storage-area offset (SAO). The RAD is used to identify the storage location 22 in the MMIO adapter address space 14 that contains the data associated with the specified adapter resource 16. In an exemplary embodiment, the resource-address designation (RAD) exhibits the following format, individual field sizes may vary according to the desired magnitude or scale of a particular dimension:

TABLE 2

Resource-Address Designation (RAD).

| Adapter ID | RT | RID | SAT | SAO |
|---|---|---|---|---|
| 16 | 24 | | 48 | 52 63 |

Where:

Adapter type (AT): Determines a particular class of adapter 12 from the possible population of adapters 12. It should be noted that the adapter type is not part of a RAD but instead is specified elsewhere in the issuing MMIO instruction. This permits the RAD to be treated as another form of 64-bit address in one illustrative embodiment.

Adapter Identifier (AID): Bit positions 0–15 of the RAD contain a 16-bit unsigned binary integer that is used in conjunction with the adapter type to designate an MMIO adapter 12.

Resource Type (RT): Determines a particular class of resource 16 from the possible set of resources 16 of an adapter 12. For example, bit positions 16–23 of the RAD specify a resource type. Valid values and their meanings depend on the specified adapter type.

Resource Identifier (RID): Determines a particular resource 16 from a given resource type. For example, bit positions 24–47 of the RAD contain a 24-bit unsigned binary integer that identifies an adapter resource 16. This value is returned by an ALLOCATE ADAPTER RESOURCE instruction.

Storage-Area Type (SAT): Determines a particular class of resource storage from the possible set. For example, bit positions 48–51 of the RAD contain a 4-bit unsigned binary integer that specifies an adapter-storage-area 18 type. The SAT value must correspond to a defined adapter-storage area 18 for the designated resource type.

Storage-Area Offset (SAO): Determines the byte offset within a given storage-area 18 type. For example, bit positions 52–63 of the RAD specify the location of the data within the specified adapter-storage area 18.

In an implementation of an exemplary embodiment, to verify that a program is authorized to access the adapter-storage location 22 designated by the specified resource-address designation (RAD), access-right checks are performed in two ways: token-match and problem-state control checking. Token-match checking is performed as follows.

When a CPU 30 is in the supervisor state, a PID is specified as input and compared with the value of the PID associated with the designated resource 16. If the values do not match, the operation fails and access is not permitted. In other words, verification is employed to ensure that the process that requests access to a resource 16, is actually the process to which a given resource 16 has been allocated.

When a CPU 30 is in the problem state, the PID type associated with the designated resource 16 is used by the machine to locate a PID in a selected real-storage location, and then the selected PID is compared to the PID associated with the designated resource 16. If there is a mismatch, access is not permitted. If token-match checking completes successfully and a CPU 30 is in the problem state, problem-state control checking is performed as follows: problem-state controls associated with the designated resource 16 are queried, if the problem-state control for the specified adapter-storage-area 18 type is zero, a privileged-operation exception is recognized. If the control is one, access is permitted.

In an exemplary embodiment, MMIO store operations are governed by a synchronization control specified as an input of the STIO instruction. When the synchronization control is zero, the specified data is queued for store in the adapter 12 before the instruction completes. The store is not necessarily completed; that is, the data is not necessarily placed in the designated adapter-storage location 22 before the instruction completes. When the synchronization control is one, the specified data is placed in the designated adapter-storage location 22, before the instruction completes. That is, stores to the designated adapter-storage location 22 are necessarily completed before the instruction completes. It will be appreciated that in zSeries® main-memory rules, stores are always considered to be synchronous. However, introduction of an adapter address space 14 as an alternate addressable space, facilitates the definition of new constraints on store function processing. Advantageously, an exemplary embodiment facilitates asynchronous processing for a store instruction, which among others enhances performance by permitting the CPU to move to another instruction prior to the completion of a store. For example, a sequence of STIO instructions are processed in a first in first out (FIFO) fashion, and may be quickly requested such that an adapter's input FIFO queues the requests for completion, and thereby frees the program to be more productive. At some point, an LIO or other action is completed, which will ensure that the prior stores have completed and thereby providing synchronization between the adapter 12 and the program.

In an exemplary embodiment, the execution of the LOAD MEMORY-MAPPED I/O instruction results in the performance of a serialization function with respect to main storage after the LIO instruction is executed to ensure that all conceptually subsequent fetches from main-storage locations associated with the designated resource 16 obtain contents at least as recent as the adapter data obtained by this instruction. Similarly, the execution of the STORE MEMORY-MAPPED I/O instruction results in performance of a serialization function with respect to main storage before the instruction is executed to ensure that all conceptually previous storage accesses to main-storage locations associated with the designated resource 16, are completed before this instruction. Similarly, as stated earlier, execution of a LOAD MEMORY-MAPPED I/O (LIO) instruction and/or a STORE MEMORY-MAPPED I/O (STIO) instruction should be serialized with respect to FREE ADAPTER RESOURCE (FAR) instructions freeing a resource 16 affected by the MMIO load or store operation.

Adapter Resource Table and Access Tables

In an exemplary embodiment, the resources 16 supported by the adapter 12 are defined in an adapter-resource table (ART) associated with the adapter 12. For illustration, an adapter-resource table is designated by an adapter type (AT) and adapter identifier (AID). An adapter-resource table entry may contain, but not be limited to, the following information:

TABLE 3

Adapter Resource-Table Entry.

| Bytes | | | | | | |
|---|---|---|---|---|---|---|
| 0–7 | ASAB | | PRC | Maximum Resource Count | | |
| 8–15 | SAC | Reserved | Special MRWPTE Count | Reserved | | |
| 16–23 | Reserved | Last Allocated Resource Identifier | | Reserved | Resource Identifier Limit | |
| 24–31 | Access-Table Address (ATA) | | | | | Reserved |
| 32–39 | Storage-Area-0 Address (SA$_0$A) | | | | | Reserved |
| 40–47 | Storage-Area-1 Address (SA$_1$A) | | | | | Reserved |
| ... | ...... | | | | | ... |
| p-q | Storage-Area-N Address (SA$_N$A) | | | | | Reserved |
| Bits 0 | 8 | 16 | | 32 | 40 | 52  63 |

Each adapter-resource-table entry (ARTE) is associated with a resource type (RT). In an exemplary embodiment, the first ARTE corresponds to resource type 0, the second ARTE corresponds to resource type 1, and so on. The fields in the adapter resource-table entry (ARTE) may be allocated as follows:

Assigned-Storage-Area Bits (ASAB): Bits 0–N of bytes 0 and 1 of the ARTE, with N being the value of the storage-area count minus one, correspond to each of the adapter-storage area types 18 defined for the specified adapter type. When an ASAB bit is zero, the corresponding adapter-storage-area type is not assigned to the specified resource 16 and the contents of the associated storage-area-address field in the ARTE are not valid. When an ASAB bit is one, the corresponding adapter-storage-area type (SAT) is assigned to the specified resource 16 and the contents of the associated storage-area-address field in the adapter-resource-table entry are valid. A doubleword in the range 4–19 is used to establish an adapter address-space base address for the respective adapter-storage-area type or is ignored. The final set of unused doublewords may be truncated from the ARTE.

Pre-allocated Resource Count (PRC): Specifies the count of resources of the specified resource type that are pre-allocated by the machine and not available to a program. In an exemplary embodiment Bytes 2 and 3 of the ARTE contain a 16-bit unsigned binary integer that specifies the number of resources 16 of the specified type that are pre-allocated in the corresponding access table when the access table is created. Pre-allocated resources 16 are defined as reserved in hardware for internal CPU 30 use. They cannot be accessed by programs.

Maximum Resource Count (MRC): Bytes 4–7 of the ARTE contain a 32-bit unsigned binary integer that specifies the maximum number of resources 16 of the specified type that can be allocated in the adapter. The MRC value multiplied by the access-table-entry size in bytes is the size in bytes of the access table for the corresponding resource type (RT).

Storage-Area Count (SAC): Specifies the maximum number of adapter-storage-area types 18 associated with the corresponding resource type. In an exemplary embodiment, Byte 8 of the ARTE contains an 8-bit unsigned binary integer that specifies the maximum number of adapter-storage-area types 18 supported by the corresponding resource type (RT). For every adapter-storage-area type 18 supported, there is a storage-area-address field in the adapter-resource-table entry. Valid values depend on the adapter type (AT) and resource type (RT). It should also be noted that SAC=number of bits set to one in ASAB.

Special MRWPTE Count (SMC): When the ART represents an adapter type whose type code is 00 hex (Host Channel Adapter), this field specifies the number of special MRWPTEs in the ARTE for resource-type 04 hex (MRWPTE), otherwise the field is reserved.

Last-Allocated-Resource Identifier (LARID): Specifies the resource identifier of the most-recently allocated resource 16 of the resource type. In an exemplary embodiment, bytes 17–19 of the ARTE contain the 24-bit resource identifier of the last resource of the specified type allocated by an ALLOCATE ADAPTER RESOURCE instruction.

Resource-Identifier Limit (RIL): Bytes 21–23 of the ARTE contain a model-dependent 24-bit resource identifier which is the starting value of a range of virtual resource identifiers. In other words, specifies the maximum resource ID possible for an allocable resource 16 of a resource type when allocated by the machine. The RIL value informs the program of the range of RID values that are not recognized by the adapter 12. The definition of interpretive execution includes the recognizing of an interception whenever an MMIO instruction that specifies a RID has a value in the unrecognized range. Thus, the host program receives control back from the guest due to such an interception of the guest. The host program may now emulate the resource if that type of support is provided. When such emulation is provided, it may well be that no actual access of any adapter is performed. For example, a host program could provide a means of guest-to-guest inter-process communication by providing virtual resources to any/all of its guests without involving any adapter hardware.

Access-Table Address (ATA): With twelve zero bits appended on the right, specifies the 64-bit block address of the access table for the resource type. An access table consists of a sequence of access-table entries where an entry is determined by a resource ID (RID). In an exemplary embodiment, bits 0–51 of bytes 24–31 with 12 zeros appended on the right form the 64-bit absolute address in machine storage (also known as hardware system area, HSA) of the access table for the specified resource type (RT). The address is designated on a 4K-byte boundary.

Storage-Area-i Address ($SA_iA$): Bits 0–51 of the doublewords from bytes 32–39 through bytes p–q of the ARTE, with 12 zeros appended on the right of each, form 64-bit addresses that designate the locations in the adapter address space 14 of the storage areas 18 associated with the specified resource type (RT), where i represents each of the adapter-storage-area 18 types. For example, in an exemplary embodiment, the following adapter-storage-area types 18 are defined for the eServer InfiniBand host-channel adapter 12:

Storage Area 0: Super-Privileged-Storage Area (SPSA);
Storage Area 1: Real-Storage Area (RSA);
Storage Area 2: Privileged-Storage Area (PSA); and
Storage Area 3: User-Storage Area (USA).

In an exemplary embodiment, an access table defines the access rights to storage areas 18 in the adapter address space 14 assigned to a resource 16. The access table is resource type specific and is designated by an adapter type (AT) and adapter identifier (AID). Access tables are built at initial microcode load (IML, e.g., initialization) time from information stored in the adapter-resource table. In an exemplary embodiment one access table is established for every resource type (RT) defined in the adapter 12. Each entry in the access table is indexed by the resource identifier (RID). An entry fetched from the access table contains an internal representation of a resource-information block (RIB).

Table 4 illustrates the access-table entry (ATE). This collection of data is sometimes referenced as the resource information or resource-information block.

TABLE 4

Access Table Entry for Resource Type (Indexed by RID).

| PSC | Reserved | SIEC | RA | RES | M | P | V | PT |
|---|---|---|---|---|---|---|---|---|
| RZONE | GOID | | | PID | | | | |
| | 16 | 32 | | 48 | 53 | | 56 | 63 |

Where:
Problem-State Controls (PSC): Specifies permissions for a problem-state program to access storage-area types of the resource 16 represented by the ATE. A value in the range 0–15 specifies a privilege level and includes all lower privilege levels SIE Controls (SIEC): Specifies interception controls. Each bit corresponds to a storage-area type. When a bit is one, access to the corresponding storage-area type is permitted; when zero, interception is recognized.

Resource Attributes (RA): Specifies special resource characteristics according to the resource type.

Path Migration Bit (M): When one, indicates that path migration is in progress for the queue pair (QP) when the resource type is a QP.

Pre-allocated Bit (P): When one, indicates that the resource 16 is allocated by the machine; when zero, indicates that the resource 16 is available to be allocated by a program.

Valid Bit (V): When one, indicates that the resource 16 has been allocated by a program; when zero, indicates that the resource 16 is available to be allocated by a program.

Process-ID Type (PT): Specifies a type code in the range 0–255 where each code corresponds to a defined, real address. Each address is specific to an operating system and is used to determine the identifier of a process within the operating system.

Relocation Zone (RZONE): Specifies a value in the range 0–255 that determines the relocation zone to which the resource 16 is allocated. An adapter 12 uses the relocation zone to specify a zone origin and zone limit pair of system storage addresses. (See also Partition Number PN)

Guest-Owner ID (GOID): Specifies a 24-bit identifier that provides more granular ownership of the resource 16. Each relocation zone contains a complete set of $2^{24}-1$ guest-owner IDs.

Process ID (PID): Specifies a 32-bit identifier that provides even more-granular ownership of the resource 16. Each GOID contains a complete set of $2^{32}-1$ process IDs.

Turning now to FIG. 2A–2C and FIG. 3 as well, an exemplary illustration of resource address translation is depicted. Resource-address translation is a process by which a resource-address designation (RAD) is decomposed such that the address space of a memory-mapped adapter 12 can be accessed.

When a LOAD MEMORY MAPPED I/O or a STORE MEMORY MAPPED I/O instruction is executed, the resource-address designation (RAD) is used to identify the storage location in an MMIO adapter address space that contains the data associated with the specified adapter resource 16. The adapter type (AT) specified in the instruction and the adapter identifier (AID) in the RAD, are used to locate the adapter-resource table (ART). The resource type (RT) is then used as an index into the adapter-resource table (ART) to obtain the adapter-resource-table entry (ARTE) for the selected resource 16.

The adapter-resource-table entry (ARTE) for the resource contains information for location of the access table for the selected resource 16. For example, in one embodiment the adapter-resource-table entry (ARTE) for the resource contains an address location for the access table. It also contains the location in the adapter address space 14 of the adapter-storage areas 18 assigned to the resource 16. For example, in an exemplary embodiment, the base addresses and address space assigned as user-storage area, privileged-storage area, real-storage area, and super-privileged-storage area are illustrated. The resource identifier (RID) is used as an index into the resource access table to get the corresponding access-table entry. The access-table entry corresponding to the allocated resource 16, contains access rights to the adapter-storage areas 18 assigned to the resource, as well as a token, which is used to verify the rights to perform load and store operations to these adapter-storage areas 18.

FIGS. 2A–2C and 3 illustrate the resource address translation process of an exemplary embodiment for the eServer InfiniBand™ host-channel adapter 12. For the example, the following values are employed:

AT=0, The adapter type is an eServer InfiniBand Host-Channel Adapter (HCA),
AID=0. The HCA adapter ID is zero.
RT=2. The resource type is a completion queue (CQ).
RID=2. The resource ID of the CQ is two.
SAT=2. The storage-area type is the privileged storage area.
SAO=8. The storage-area offset is eight.

Thus, for the example, the RAD would take the value 0000 02 000002 2 008 hex.

Turning now to FIG. 2A, the Adapter Resource table may readily be located based on the adapter type and Adapter identifier (AID). In the example, an adapter type 00 and AID of 0000 are depicted. Turning to FIG. 2B, the ARTE for a given resource 16 is indexed by the resource type (RT) to locate the entry for the resource 16, in this instance resource type (RT) 02 corresponding to a completion queue (CQ). For the example, it will be appreciated that the resource type (RT) and resource identifier (RID) may readily be acquired from the resource address designation (RAD). At FIG. 2C it may be observed that the ARTE includes the access table address (at double word 3) as well as a variety of base addresses corresponding the various storage area 18 types (SAT) e.g., double words 4–19) In the example, and as stated earlier, 4 storage area types are employed, however, in the FIG. 16 are depicted.

Figure 3:
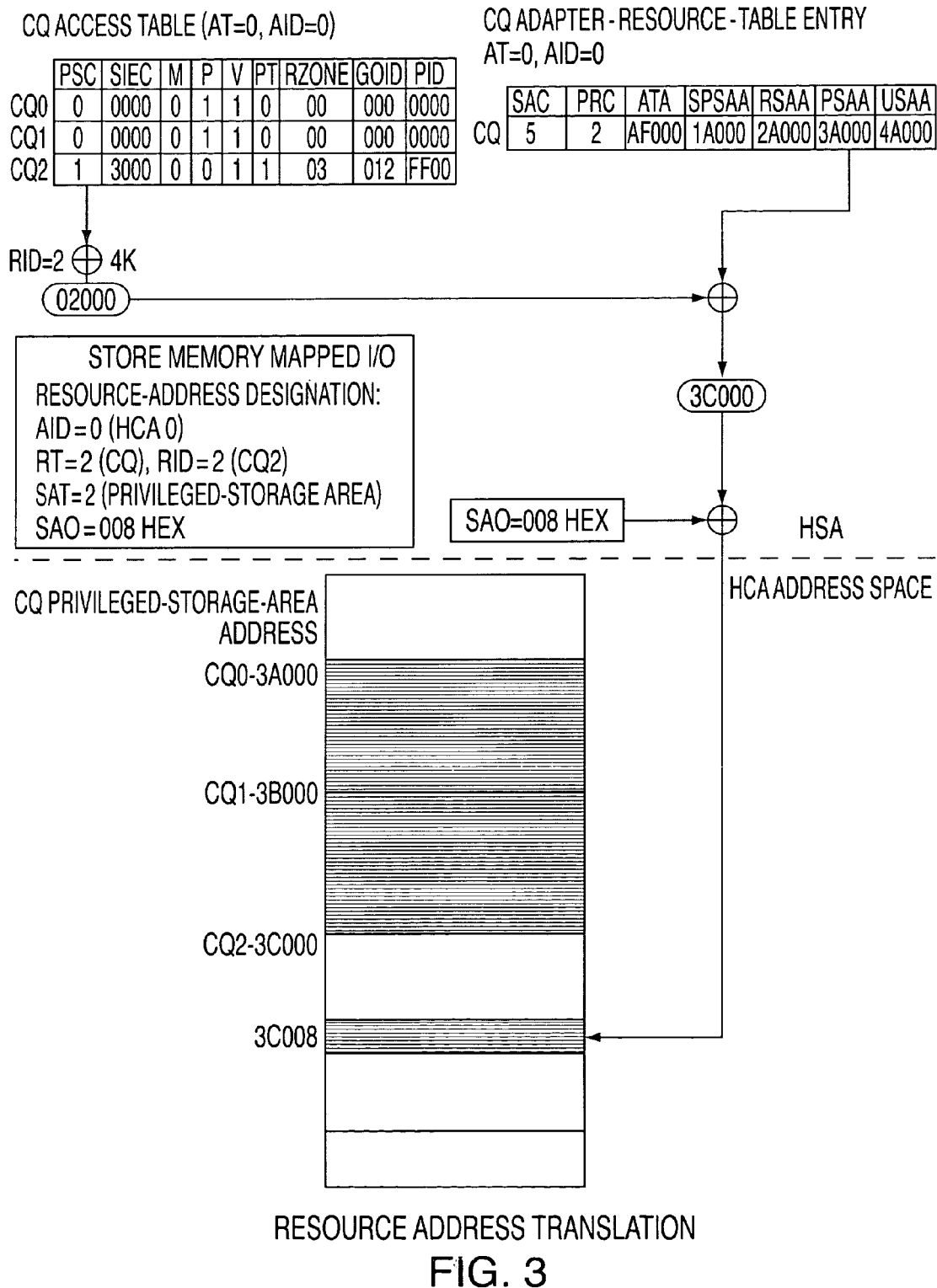
FIG. 3 is a simplified block diagram depicting an illustrative resource address translation in accordance with an exemplary embodiment.

Turning now to FIG. 3 as well, in order to locate a 4 KB privileged-storage area 18 that corresponds to the allocated completion queue (CQ), the resource identifier (RID=2) in this instance, is multiplied by 4K and added to the privileged storage area base address found in the adapter resource table entry for the completion queue. In the example as depicted in the figure, the RID=2, multiplied by 4K yields 02000. The resultant 02000 is added to the PSAA of 3A000 to yield 3C000. The storage area offset, in this instance 008, is then added to the resultant, 3C000 yielding 3C008 which is used to locate the data within the privileged storage area assigned to the completion queue.

Additional information in the example includes the following facts and observations to facilitate appreciation of the exemplary embodiments:

CQs 0,1, and 2 are valid. CQ0 and CQ1 are preallocated by the machine.

SIE controls are set to intercept on storage-area type (SAT) for references to real-and error-adapter-storage-area types.

The PID type (PT) for CQ2 is one. This means that the PID of a problem-state program issuing LIO and STIO would be at a selected address whose selection is a function of a particular operating system, due to the PT having been specified when the CQ was allocated. In an exemplary embodiment, and the example herein, for z/OS, the location 224 hex is employed. Thus, in reference to FIG. 4, the owning application has a PID value of FF00 hex that is verified during execution of LIO and STIO by comparing the PID value in the access-table entry vs. the value in real location 224 hex of the issuer.

The guest-owner ID (GOID) for CQ2 is 012 hex. Therefore, a guest issuing LIO and STIO against CQ2 is verified as the owner of CQ2 by comparing the GOID value (012 hex) in the access-table entry with the GOID field in the SIE state description of the issuing guest.

MMIO Virtualization in z/Architecture

In yet another exemplary embodiment, memory-mapped I/O virtualization in the z/Architecture® is achieved through adapter virtualization and software emulation of adapter resources 16. The virtualization is achieved by the addition of controls by which interpretive execution of a program can provide direct LIO/STIO access to an adapter, whether real or emulated. It will be appreciated that the exemplary embodiments described herein are illustrated employing references to zVM® and the z/Architecture® for simplicity and clarity. It should be appreciated that the disclosed embodiments may readily be applied to other architectures and virtual machine configurations. In addition to the parameters discussed earlier in the previously mentioned exemplary embodiments, additional parameters are provided to the CPU by a host program that starts a guest program. The additional parameters used for interpretive execution are not visible to the guest program nor are they present in the resource-address designation (RAD). Instead, they are established in each resource 16 during the allocation process. During interpretive execution, these parameters are implicitly available and inform the CPU 30 how to contain and navigate access to each resource 16 when LIO and STIO are issued by the guest program. The parameters involved with interpretive execution are identified and explained herein with reference to Table 5.

To further facilitate understanding, a brief overview of interpretive operation is provided. All instructions are designed to operate interpretively at a guest-1 level in a given logical partition. The LPAR hypervisor (e.g., for the z/Architecture) exhibits minimal involvement once it has established the state-description contents for each guest-1 CPU. However, at guest-2 level, only the LIO and STIO instructions are configured to operate interpretively. The others instructions (ALAR, FAR, MAR, STAR) relinquish control to the zVM® host program that emulates the function. Because ALAR, FAR, MAR, STAR are infrequent setup instructions that are expected to be employed less often, it is therefore advantageous to execute them with the zVM® hypervisor rather than in an interpretive-execution environment. For LIO and STIO it is advantageous to make these instructions operable in problem state without operating-system intervention as well as at guest-2 problem state without zVM® hypervisor intervention.

Logical partitioning and virtual machines (VM) are widely known techniques that allow multiple O/S images to run on a single machine. In such an environment, CPU and I/O resources are shared among potentially thousands of O/S images. When it comes to memory-mapped I/O, it is necessary to 1) allow sharing of MMIO adapter resources not only among logical partitions, but also among the thousands of O/S images that may be running on top of the zVM hypervisor in one of the level-2 guest configurations, and 2) prevent O/S images from accessing resources owned by another image. In order to support large scale sharing of adapter resources and provide resource isolation among O/S images in a virtualized environment, e.g. zVM, a mechanism to virtualize memory-mapped I/O needs to be provided.

Memory-mapped I/O virtualization can be achieved through adapter virtualization and software emulation of adapter resources.

Adapter Virtualization

In a virtualized environment, virtualization provides a direct mapping between a real adapter resource (e.g., adapter hardware) 16 and a host program (e.g., an O/S image software). In addition, adapter virtualization also provides a direct mapping between a software emulated (virtual) resource and a host program. The purpose of adapter virtualization is threefold: 1) to enforce adapter-resource (real or virtual) allocation policies and access rights, 2) to provide memory virtualization, and 3) to provide functional emulation of a virtual resource.

Allocation Policy Enforcement: Allocation of adapter resources 16 among different logical partitions is subject to policies that are enforced by either the machine or by a host program. Policies for resource allocation among OS images within a single logical partition are enforced by the zVM hypervisor. Resource allocation policies determine how many resources 16 of each type can be allocated by each logical partition and by each O/S image within a partition.

Access Rights Enforcement: In a virtualized environment where multiple OS images may run on a single logical partition on top of the zVM hypervisor, resource ownership is established not only by the logical partition identifier, but also by a guest/owner identifier (GOID). It will be appreciated that the logical partition identifier no longer uniquely identifies an OS image, therefore, a guest/owner identifier (GOID) is also employed to establish resource 16 ownership. This helps prevent an OS image from accessing resources 16 it does not own. It also helps prevent unsolicited communications across OS images.

Memory virtualization: Since most memory-mapped I/O channel adapters are a form of direct memory access (DMA) engine, an adapter-resource context kept in the adapter-address space 14 may contain, among other things, the addresses in main storage of the data to be transferred to and from the MMIO adapter 12. These are the addresses that the MMIO adapter 12 will place on the memory bus of the machine to get to the data and therefore must designate what is defined in the z/Architecture as an absolute addresses.

When a fixed-storage-mode guest program accesses adapter-resource controls that designate absolute addresses relative to the relocation zone of the guest, the operation can proceed without involvement of the hypervisor. This is so because the adapter 12 has the ability to perform a single level of zone-to-system absolute address translation and can therefore translate zone addresses specified by the guest into system absolute addresses. During adapter initialization (not resource), the adapter 12 is informed of the relocation zone (RZONE) origin and limit system addresses that correspond to logical-partition absolute address zero and the maximum logical-partition absolute address.

When a pageable-storage-mode guest program accesses adapter-resource controls that designate absolute addresses, the operation needs to be processed by the zVM hypervisor. The zVM hypervisor remaps the guest-absolute address into the host-absolute address and places it into the MMIO adapter address space 14. Likewise, when the adapter resource 16 is intended to be used in association with I/O requests specifying absolute addresses, or in association with high-performance memory regions, all accesses to the adapter resource 16 have to be processed by the zVM hypervisor. This is achieved by providing a one to one mapping of software resources to physical adapter resources 16; that is, by allocating a physical resource 16 and enabling the resource 16 for zVM hypervisor processing.

Software Emulation of Adapter Resources

Software emulation of adapter resources 16 may be provided when a single physical resource 16 needs to be shared among several OS images or when communication needs to be established among resources 16 within the same zVM hypervisor (between pageable-storage-mode guests). In an exemplary embodiment, software emulation of an adapter resource 16 requires the allocation of a virtual resource, that is, one that is not physically present on an MMIO adapter 12. For example, in one exemplary embodiment, virtual resources are defined by establishing a threshold within the resource identifiers space (See RIL as disclosed herein). In an exemplary embodiment, resource identifiers above the threshold correspond to virtual resources. Resource identifiers below the threshold correspond to physical resources 16. The zVM hypervisor is responsible for managing the allocation of real and/or virtual resource identifiers among its guests. It will be appreciated that a zVM hypervisor performs and operates similarly to the LPAR hypervisor. However, it will also be appreciated that the LPAR hypervisor is configured to only handle guest-1 processes that handle only real devices, whereas zVM manages both real (physical) resources 16 and virtual resources.

Virtual resources are by definition enabled for zVM hypervisor processing. A many-to-one mapping may be established between virtual resources and a physical adapter resource 16. Access to a virtual resource is handled by the zVM hypervisor and may not require access to any physical resource(s) 16.

In an exemplary embodiment, two fields are added to the resource information block to support adapter virtualization. These two fields are denoted SIE interpretation controls (SIEC) and guest/owner identifier (GOID). The SIE interpretation controls (SIEC) are used to enable zVM hypervisor processing of operations accessing an adapter resource 16. These controls allow fine-tuning of zVM-hypervisor processing to specific storage-area accesses through the setting of individual SIE interpretation control bits, and complete enabling of an adapter resource for zVM-hypervisor processing, through the setting of all the SIE interpretation control bits. The guest/owner identifier (GOID) is used for access rights enforcement. The additional parameters used for interpretive execution are not visible in the resource-address designation (RAD). Instead, they are established in each resource during the allocation process. During interpretive execution, these parameters inform the CPU 30 how to contain and navigate access to each resource when LIO and STIO are issued by the guest program. The parameters involved with interpretive execution are identified and explained herein with reference to Table 5. Table 5 depicts an Access Table Entry for a selected resource type (Indexed by Resource ID)

TABLE 5

Access Table Entry for Resource Type(Indexed by RID)For Virtualization.

| PSC | Reserved | SIEC | RA | RES | M | P | V | PT |
|-----|----------|------|-----|-----|---|---|---|-----|
| RZONE | | GOID | | PID | | | | |
| | | 16 | 32 | 48 | | 53 | 56 | 63 |

Where

SIE-Interpretation Controls (SIEC): When MMIO virtualization is enabled, the resource-information block (RIB) associated with an adapter resource 16 contains control bits that specify for a pageable-storage-mode guest, whether load and store operations to the corresponding adapter-storage-area type are processed by the zVM hypervisor. The SIEC specifies a bit mask that corresponds to the adapter-storage-area types and establishes whether or not an interception of LIO and STIO may be recognized when issued by a guest program. Each bit position corresponds to an adapter-storage-area type. In an exemplary embodiment, when a SIEC bit is one, load and store operations to the corresponding adapter-storage-area type are not processed by the zVM hypervisor. When a SIEC bit is zero, load and store operations to the corresponding adapter-storage-area type are processed by the zVM hypervisor. A SIE-interpretation-control bit is defined for each adapter-storage-area type assigned to a particular resource type. The number of SIEC bits that are defined depends on the adapter type (AT) and the resource type (RT).

Guest/Owner Identifier (GOID): When MMIO virtualization is enabled, the resource-information block (RIB)

associated with an adapter resource 16 contains a 24-bit unsigned binary integer that identifies a pageable-storage-mode guest. In an exemplary embodiment, the GOID specifies the guest-2 or subdivision within a logical partition in which a resource 16 is allocated. This provides the separation needed at the second level of interpretive execution. The GOID is used in conjunction with the PID and the partition number as a token to verify access rights to the adapter-storage-area types 18 assigned to a resource 16.

Relocation Zone (RZONE): Specifies the logical partition in which a resource is allocated. The RZONE check performed during execution of LIO and STIO ensures that the walls that separate logical partitions are maintained; a program in LPAR A cannot access a resource allocated in LPAR B.

These parameters are applied during the resource allocation process. Guest-2 interception to a host program is normally involved since the host program must establish the SIEC and GOID controls; the guest-2 has no knowledge of them. Guest-1 (aka logical partition) execution proceeds interpretively as the RZONE control is available to the CPU from its SIE state description. But, as with other confinement aspects, the overhead processing occurs only during allocation and the associated checking is handled by the machine during runtime of LIO and STIO. So, advantageously, in an exemplary embodiment, even for a guest-2 at the second level of interpretive execution, the guest-2 application's direct access to the machine to perform the primary I/O function has been preserved. In addition, it will be appreciated that the previously mentioned PID-type (PT) is now more meaningful in the interpretive execution context since each guest may be running a different operating system.

In yet another exemplary embodiment, provisions are included for the virtualization of an error storage-area (ESA) for an adapter that is associated with an ESA storage-area type. Under certain error conditions, the ESA storage area of a resource may be fetched by execution of the LIO instruction. It may readily be appreciated that the ESA is entirely an artifact of virtualization or host-program emulation. The intent is to abstract details of adapter failures and characteristics into a simplified representation. For example, if an adapter 12 can fail in one hundred different ways but the process can only take one of five distinct actions for any of those one hundred failures, then having the program perform a level of analysis to determine which of the 5 to perform is not useful. Notwithstanding this, the details of the failure would be captured by the machine for the purpose of feeding the failure data into the machine maintenance functions.

Allocate Adapter Resource

The ALLOCATE ADAPTER RESOURCE (ALAR) instruction provides mechanisms to enforce resource allocation policies and access rights to a particular resource 16, as well as support for memory virtualization and software emulation of virtual resources. In one exemplary embodiment, resource allocation policies for real adapter resources 16 among different logical partitions are enforced by the machine. Resource allocation policies for real and virtual resources among O/S images within a logical partition of the machine running zVM hypervisor are established and enforced by the zVM hypervisor.

In an exemplary embodiment, for a real resource allocation, the zVM hypervisor issues (reissues on behalf of a guest) the ALAR instruction to the CPU 30 so that the adapter 12 may allocate a real resource 16 to the process. As described earlier, the real resource id RID and resource count are returned. If a virtual resource is to be allocated, then the host wants then, the zVM hypervisor provides the emulation(s) for the virtual resource(s) and returns a RID corresponding to a/the virtual resource(s).

When the ALLOCATE ADAPTER RESOURCE instruction is executed, the number of resources (whether real or virtual) requested is checked against the number of resources of the specified type already allocated to the issuing logical partition, and the maximum number of resources of the specified type that the particular partition is allowed to access. In addition, if the request comes from a pageable storage-mode guest, the zVM hypervisor ensures that the guest only acquires its assigned portion of resources from the pool of resources that the zVM partition is allowed to access. If a virtual (software-emulated) resource is allocated, the zVM hypervisor enforces the resource-allocation policies for virtual resources among its guests.

When an adapter resource is allocated, a resource-attributes (RA) input specifies resource properties that provide information on the intended use of the resource. These resource properties are checked by the zVM hypervisor to determine whether a virtual or real adapter resource 16 needs to be allocated. If any of the RA bits is set to one, the zVM hypervisor may allocate a virtual resource. Otherwise, the zVM hypervisor allocates a real resource 16.

When MMIO virtualization is enabled, the SIE-interpretation controls (SIEC) and the guest/owner identifier (GOID) are specified as inputs of the ALLOCATE ADAPTER RESOURCE instruction and the SIEC and GOID associated with the allocated resource are set to the values specified by the instruction. The GOID is set to establish resource ownership of the resource and distinguish between multiple guests in a logical partition. The SIE-interpretation controls associated with the allocated resource are set to specify when LOAD/STORE operations are processed by the zVM hypervisor, based on the storage-area type being accessed.

Once a resource has been allocated in a virtualized environment, it can be optionally freed using the FREE ADAPTER RESOURCE (FAR) instruction. In an alternative embodiment, the MODIFY ADAPTER RESOURCE (MAR) and STORE ADAPTER RESOURCE (STAR) instructions, as described earlier herein, may be used to change certain attributes of the resource. Similar to allocation, for the FREE ADAPTER RESOURCE (FAR) instruction, when an adapter resource is to be freed, or the STORE ADAPTER RESOURCE (STAR) and MODIFY ADAPTER RESOURCE (MAR) instructions, when an adapter resource is to be changed, the zVM hypervisor is best suited for performing the respective functions on behalf of the guest that originally issued the instruction.

Resource-attributes (RA) input specifies resource properties that provide information on the intended use of the resource. Additionally, during allocation, the specified resource attributes indicate to the zVM hypervisor whether a real vs. a virtual resource is appropriate.

In addition, once a real resource 16 has been allocated, it can be optionally enabled for zVM-hypervisor processing on a storage-area type basis, by modifying the SIE-interpretation control associated with a particular storage-area type using the MODIFY ADAPTER RESOURCE (MAR) and STORE ADAPTER RESOURCE (STAR) instructions as described earlier herein. For MAR and STAR, zVM hypervisor involvement is also necessary to ensure that hypervisor control over a resource is not broken by guest-only execution.

Disable Memory Region

The Disable MEMORY REGION (DMR) instruction facilitates memory management for a pageable-storage mode guest. DMR disables a memory region in said adapter such that said memory region may be enabled for another process, wherein said instruction is a privileged instruction that is executed in a supervisor state of a machine.

DMR is used to provide a clean separation between a previous user and the next user by ensuring that all storage transfers in/out of the memory region are completed for the previous user. This keeps data from moving in/out of process A's storage after the region has been reassigned to process B.

Load/Store Memory-Mapped I/O

In an exemplary embodiment, MMIO virtualization is supported in the LOAD/STORE MEMORY-MAPPED I/O instructions when executed by a pageable-storage-mode guest, by: Verifying the type of resource as real or virtual by determining whether the resource designated by the resource-address designation (RAD) exhibits a resource identifier (RID) that exceeds a selected threshold value. If the resource identifier (RID) exceeds the selected threshold value, a virtual resource is recognized, execution of the issuing guest program is intercepted, and the instruction is processed by the zVM hypervisor.

Conversely, for a real resource 16, the following additional verifications are performed to execute the instructions. The guest/owner identifier (GOID) associated with the designated resource is compared with that of the pageable storage-mode guest. If there is a mismatch, the instruction is not successfully completed whether the CPU is in the problem state or the supervisor state. The GOID associated with the designated resource must be verified, to prevent unauthorized access to the information associated with the designated resource and avoid covert channels. If there is a match, processing proceeds with a PID comparison, and is followed by problem-state checking, as described in earlier embodiments. Finally, if the SIEC bit for the storage-area type being accessed is set to zero, the processing is to be performed by the zVM hypervisor. Otherwise, once resource ownership and access rights are validated, the instruction is completed by the CPU 30 operating interpretively.

The disclosed invention can be embodied in the form of computer, controller, or processor implemented processes and apparatuses for practicing those processes. The present invention can also be embodied in the form of computer program code containing instructions embodied in tangible media 32, such as floppy diskettes, CD-ROMs, hard drives, or any other computer-readable storage medium, wherein, when the computer program code is loaded into and executed by a computer, controller 30, or processor, the computer, controller, or processor 30 becomes an apparatus for practicing the invention. The present invention may also be embodied in the form of computer program code as a data signal 34, for example, whether stored in a storage medium, loaded into and/or executed by a computer, controller, or processor 30, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose processor 30, the computer program code segments configure the processor 30 to create specific logic circuits.

It will be appreciated that the use of first and second or other similar nomenclature for denoting similar items is not intended to specify or imply any particular order unless otherwise stated.

It should be appreciated that while the exemplary embodiments disclosed herein are illustrated by reference to z/OS® operating system zVM® and C or C++ programming languages/compilers, the concepts of the invention(s) disclosed herein are applicable to various operating systems and applications programming languages without limitation. Similarly, while an exemplary embodiment has been applied to dynamic linked libraries, those skilled in the art will recognize and appreciate that the invention(s) disclosed herein may readily be applicable to other programming aspects.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of managing memory mapped input output operations to an alternate address space comprising:

executing a first instruction directed to a first memory mapped input output alternate address space of a machine associated with a first adapter to allocate a resource associated with said first adapter to a selected process;

wherein said selected process issues at least on of a load and a store instruction executed in a problem state of said machine to a selected address location of a selected resource;

ensuring that said selected resource corresponds with said allocated resource;

determining that said selected resource corresponds with said process to which said resource is allocated; and executing a second instruction for modifying a previously allocated resource, wherein said second instruction is a privileged instruction that is executed in the supervisor state of said machine.

2. The method of claim 1 further including a third instruction for freeing the allocated resource of said first adapter, wherein said third instruction is a privileged instruction that is executed in the supervisor state of said machine.

3. The method of claim 1 further including a fourth instruction for storing a previously allocated resource, wherein said fourth instruction is a privileged instruction that is executed in the supervisor state of said machine.

4. The method of claim 1 wherein at least one of said executing, said ensuring, and said determining is performed in a supervisory state of said machine.

5. The method of claim 1 wherein said selected process directly accesses said selected resource of said first adapter in said alternate address space.

6. The method of claim 1 wherein said first instruction is configured to prohibit said selected process from modification of said alternate address space.

7. The method of claim 1 wherein said first instruction is a privileged instruction that is executed in the supervisor state of said machine.

8. The method of claim 1 wherein said first adapter translates main-address-space virtual addresses on which said first adapter is operating into main-address-space real address within a given logical partition.

9. The method of claim 1 wherein said first adapter includes its own memory caching with respect to resource contexts.

10. The method of claim 9 wherein said first adapter caches its required memory contents from main memory of said machine.

11. A method of managing memory mapped input output operations to an alternate address space comprising:
   executing a first instruction directed to a first memory mapped input output alternate address space of a machine associated with a first adapter to allocate a resource associated with said first adapter to a selected process;
   wherein said selected process issues at least on of a load and a store instruction executed in a problem state of said machine to a selected address location of a selected resource;
   ensuring that said selected resource corresponds with said allocated resource;
   determining that said selected process corresponds with said process to which
   said resource is allocated; disabling a memory region in said first adapter such that said memory region may be enabled for another process, wherein said first instruction is a privileged instruction that is executed in a supervisor state of said machine; and
   executing a second instruction for modifying a previously allocated resource, wherein said second instruction is a privileged instruction that is executed in the supervisor state of said machine.

12. A system of managing memory mapped input output operations to an alternate address space comprising:
   a means for executing a first instruction directed to a first memory mapped input output alternate address space of a machine associated with a first adapter to allocate a resource associated with said first adapter to a selected process;
   wherein said selected process issues at least on of a load and a store instruction executed in a problem state of said machine to a selected address location of a selected resource;
   a means for ensuring that said selected resource corresponds with said allocated resource;
   a means for determining that said selected resource corresponds with said process to which said resource is allocated; and
   a means for executing a second instruction for modifying a previously allocated resource, wherein said second instruction is a privileged instruction that is executed in the supervisor state of said machine.

* * * * *